United States Patent
Kunitake et al.

(10) Patent No.: US 10,636,415 B2
(45) Date of Patent: Apr. 28, 2020

(54) METHOD OF CORRECTING DICTIONARY, PROGRAM FOR CORRECTING DICTIONARY, VOICE PROCESSING APPARATUS, AND ROBOT

(71) Applicant: Panasonic Intellectual Property Management Co., Ltd., Osaka (JP)

(72) Inventors: Yuji Kunitake, Kyoto (JP); Ryouta Miyazaki, Osaka (JP); Seiya Higuchi, Osaka (JP); Yusaku Ota, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/791,447

(22) Filed: Oct. 24, 2017

(65) Prior Publication Data
US 2018/0122365 A1  May 3, 2018

(30) Foreign Application Priority Data
Oct. 31, 2016  (JP) ................. 2016-212625

(51) Int. Cl.
*G10L 15/06* (2013.01)
*G10L 15/02* (2006.01)
*G10L 15/22* (2006.01)
*G10L 15/187* (2013.01)
*G06F 17/27* (2006.01)

(52) U.S. Cl.
CPC ............ *G10L 15/063* (2013.01); *G10L 15/02* (2013.01); *G10L 15/187* (2013.01); *G10L 15/22* (2013.01); *G06F 17/2735* (2013.01); *G10L 2015/025* (2013.01); *G10L 2015/0635* (2013.01)

(58) Field of Classification Search
USPC ............. 704/1–10, 230–257, 270–277
See application file for complete search history.

(56) References Cited

U.S. PATENT DOCUMENTS

| | | | | |
|---|---|---|---|---|
| 2001/0037200 A1* | 11/2001 | Ogawa | ............. | G10L 17/02 704/246 |
| 2007/0038453 A1* | 2/2007 | Yamamoto | ............. | G10L 13/08 704/257 |

FOREIGN PATENT DOCUMENTS

| | | |
|---|---|---|
| JP | 9-185616 | 7/1997 |
| JP | 2001-022374 | 1/2001 |

* cited by examiner

*Primary Examiner* — Huyen X Vo
(74) *Attorney, Agent, or Firm* — Greenblum & Bernstein, P.L.C.

(57) ABSTRACT

A method is provided for correcting a dictionary used in a voice processing apparatus. The method includes first extracting a speech of a target speaker from audio collected by a microphone, and estimating a speech phonemic sequence configuring the speech. The method also includes calculating a match degree, using a first dictionary, between the speech phonemic sequence and a first phonemic sequence that corresponds to a first word registered in the first dictionary, and second extracting the first word corresponding to a highest match degree as a spoken word spoken by the target speaker. The method further includes first correcting a second dictionary based on the highest match degree, the second dictionary indicating a relation between a second word and a third word, and second correcting the second dictionary by correcting the relation between the third word matching the spoken word and the second word.

8 Claims, 11 Drawing Sheets

Fig. 2

| Child vocabulary dictionary ||
|---|---|
| Phonemic seq. | Word |
| /ˈapəl/ | apple |
| /trān/ | train |
| /swēp/ | sweep |
| /swēt/ | sweet |
| /ˈsou(ə)r/ | sour |
| /ˈSHou(ə)r/ | shower |

Fig. 3

| Misrecognition correction dictionary ||
|---|---|
| Misrecog. word | Corrected word |
| sweep | sweet |
| shower | sour |
| sheepy | sleepy |

Fig .4

| Recognition history table ||
|---|---|
| Word | Mastery level |
| apple | 0.9 |
| train | 0.5 |
| sweep | 0.5 |
| sweet | 0.8 |
| sour | 0.1 |
| shower | 0.4 |

Fig. 5

| Correction history table |||
|---|---|---|
| Misrecog. word | Corrected word | Timestamp |
| sweep | sweet | 20160401 |
| cho-cho | train | 20160611 |
| sheepy | sleepy | 20160301 |

Fig. 10

| C1: | Apple sweep |
| S1: | Sweep the apple? |
| C2: | No |
| S2: | Say it again |
| C3: | Apple sweep |

Fig. 11

| Correction history table | | |
| --- | --- | --- |
| Misrecog. word | Corrected word | Freq. of correction |
| sweep | sweet | 0 time/month |
| cho-cho | train | 1 time/month |
| sheepy | sleepy | 4 times/month |

Fig. 12

| Recognition history table | | |
| --- | --- | --- |
| Word | Mastery level | Speaking freq. |
| apple | 0.9 | 1 time/month |
| train | 0.5 | 2 times/month |
| sweep | 0.5 | 1 time/month |
| sweet | 0.8 | 4 times/month |
| sour | 0.1 | 3 times/month |
| shower | 0.4 | 0 time/month |

METHOD OF CORRECTING DICTIONARY, PROGRAM FOR CORRECTING DICTIONARY, VOICE PROCESSING APPARATUS, AND ROBOT

CROSS-REFERENCE TO RELATED APPLICATIONS

The present application claims priority under 35 U.S.C. § 119 of Japanese Application No. 2016-212625, filed on Oct. 31, 2016, the disclosure of which is expressly incorporated by reference herein in its entirety.

BACKGROUND OF THE INVENTION

1. Field of the Invention

The present disclosure relates to a method of correcting a dictionary and a program for correcting the dictionary used in a voice processing apparatus, the voice processing apparatus, and a robot.

2. Description of Related Art

In a conventional voice recognition system or a character sequence conversion system, a word which is not registered in a dictionary often fails to be recognized or is misrecognized. For this concern, there is a technique for improving recognition accuracy by registering additional information such as meanings and pronunciations of the word in the dictionary, or by registering rules to correct the misrecognized word.

However, when additional information is registered in a dictionary, there is a capacity limitation for additionally registering such information in an environment where a storage space is limited. Conventionally, to address the above-mentioned concern, for example, Japanese Patent Laid-open Publication No. 2001-22374 discloses a technique of deleting old information when additional information is registered in the dictionary. Further, for example, in Japanese Patent Laid-open Publication No. H9-185616, a technique is disclosed in which additional information registered in the dictionary is sorted in an order of higher frequency of use and the information that is used the least is deleted.

However, a child in a process of learning a language increases a number of vocabulary and learns correct speech with growth, and therefore, updating the dictionary becomes necessary according to the vocabulary or speech characteristics of the child which change with growth. Accordingly, when the word or the correction rule additionally registered are deleted simply from the oldest or lower frequency of use, the word which is not mastered to be spoken correctly or the correction rule may be deleted in error.

SUMMARY OF THE INVENTION

The present disclosure is provided to address the above circumstances and provides a method of correcting a dictionary, a program for correcting the dictionary, a voice processing apparatus, and a robot capable of correcting the dictionary used in the voice processing apparatus according to a language learning stage of a speaker and improving voice recognition accuracy.

In one general aspect, the techniques disclosed here feature the method of correcting the dictionary used in the voice processing apparatus, the method extracts a speech of a target speaker from audio collected by a microphone corresponding to the voice processing apparatus; estimates a speech phonemic sequence configuring the speech; calculates a match degree, using a first dictionary, between the speech phonemic sequence and a first phonemic sequence that corresponds to a first word registered in the first dictionary, the first dictionary being stored in a memory included in the voice processing apparatus and indicating a corresponding relation between the first word and the first phonemic sequence; extracts, from the first dictionary, the first word corresponding to a highest match degree as a spoken word spoken by the target speaker; corrects a second dictionary based on the highest match degree, the second dictionary indicating a corresponding relation between a second word and a third word, the third word corresponding to a language unit spoken by the target speaker intending to speak the second word; and corrects the second dictionary by correcting the corresponding relation between the third word matching the spoken word and the second word that corresponds to the third word. These general and specific aspects may be implemented using a system, a method, and a computer program, and any combination of systems, methods, and computer programs.

According to the present disclosure, the dictionary used in the voice processing apparatus can be corrected according to the language learning stage of the speaker and the voice recognition accuracy can be improved.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 2 illustrates an example of a child vocabulary dictionary according to the first embodiment;

FIG. 3 illustrates an example of a misrecognition correction dictionary according to the first embodiment;

FIG. 4 illustrates an example of a recognition history table according to the first embodiment;

FIG. 5 illustrates an example of a correction history table according to the first embodiment;

FIG. 10 illustrates an example of a detailed interaction between a target child and the voice interaction system according to the first embodiment;

FIG. 11 illustrates another example of the correction history table according to the first embodiment;

FIG. 12 illustrates another example of the recognition history table according to the first embodiment;

DETAILED DESCRIPTION OF THE INVENTION

Figure 1:
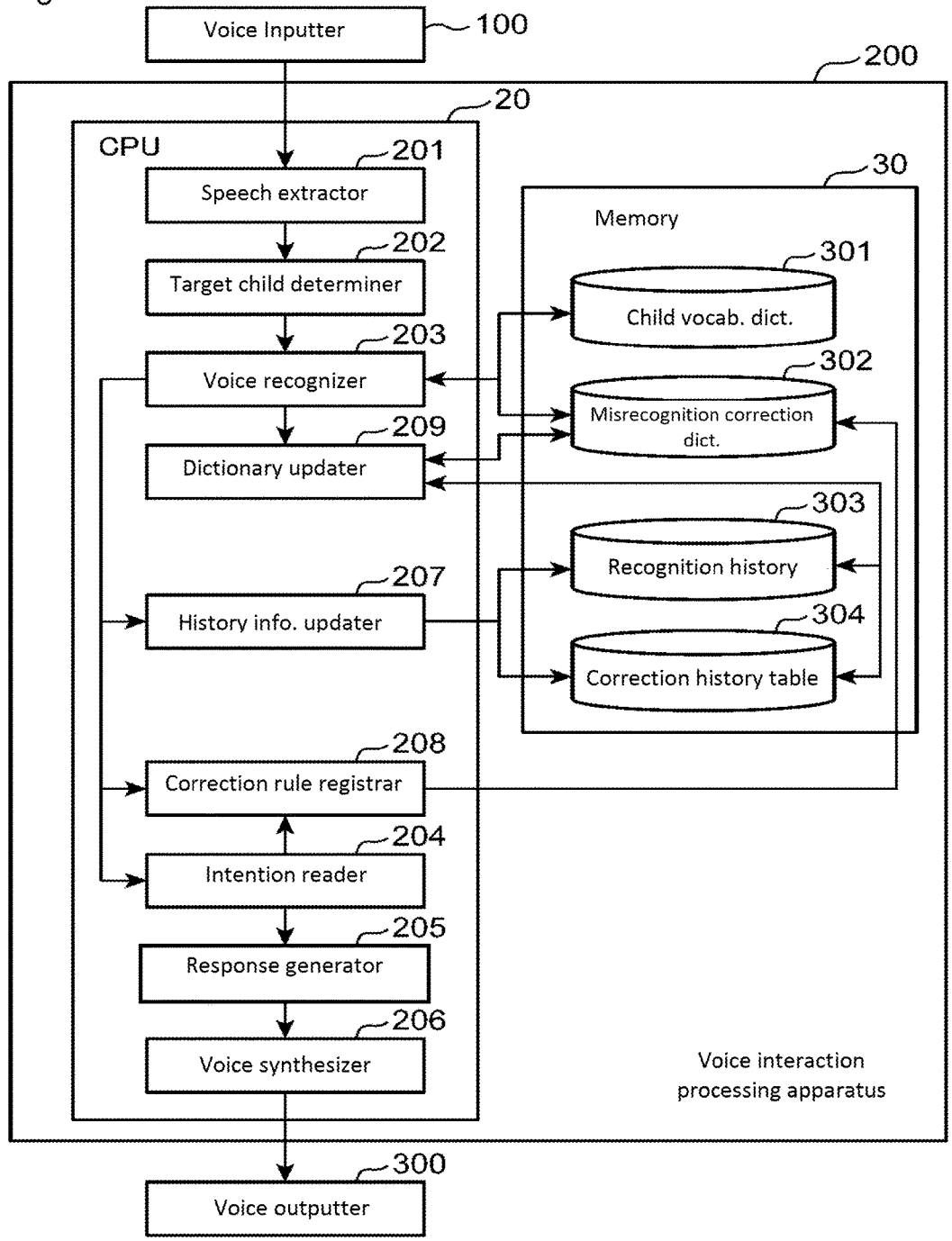
FIG. 1 illustrates an exemplary overall configuration of a voice interaction system according to a first embodiment.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Art on Which the Present Invention is Based

A technique related to a voice interaction system has been considered, the voice interaction system achieving a natural interaction with a user by analyzing a speech content from voice spoken by the user and by returning a natural response based on an analysis result, and providing a service such as controlling a device or providing information. The voice interaction system allows recognition of the voice spoken by the user by retaining, as knowledge, word information to be recognized in the voice interaction system. Meanwhile, there are variations in words spoken by the user, and therefore, registration of all word information in the dictionary is difficult.

To address such a concern, according to a technique disclosed in Japanese Patent Laid-open Publication No. 2001-22374, a new word likely to be spoken can be recognized by additionally registering, at all times, word information used in the voice interaction system to the dictionary and by deleting old word information. Further, according to above-mentioned Japanese Patent Laid-open Publication No. H9-185616, while the targeted technique is not to the voice recognition, but to a conversion of a character string, with respect to an error conversion in the character string, information being corrected is registered in the dictionary as corrected information. Accordingly, in Japanese Patent Laid-open Publication No. H9-185616, the error conversion is prevented from occurring again. Furthermore, according to Japanese Patent Laid-open Publication No. H9-185616, the technique is disclosed in which the word having been used with less frequency is deleted from the dictionary.

However, when a target of the voice interaction is a child who is in the middle of learning a language, updating the dictionary is necessary according to the child growth since the vocabulary spoken by the child increases and a word can be spoken correctly with growth. For example, when the child spoke "sweep" because the child in the past could not speak "sweet", and the voice interaction system misrecognized as "sweep", a rule is registered in the dictionary to convert "sweep" to "sweet". Accordingly, the voice interaction system corrects "sweep" to "sweet" to allow "sweet" to be recognized. Later, when the speaker who was once that child grows up and can now speak "sweet" correctly, the voice interaction system may still correct "sweep" to "sweet" by mistake even though the speaker spoke "sweep" in a correct way. Therefore, regarding the rule to correct the word after which the child has mastered the correct speech, the rule needs to be deleted in order to suppress error correction.

However, in the conventional techniques, when deleting the correction rule from the dictionary, in the order of information having the oldest registration or simply having the least frequency of use, the correction rule may be deleted despite that the child has not learned the correct speech. Thus, updating the dictionary according to the child's language learning stage has not been considered in the past. Given this, inventors examined the following strategies for improvement.

(1) One aspect of the present disclosure is a method of correcting a dictionary used in a voice processing apparatus. The method extracts a speech of a target speaker from audio collected by a microphone corresponding to the voice processing apparatus; estimates a speech phonemic sequence configuring the speech; calculates a match degree, using a first dictionary, between the speech phonemic sequence and a first phonemic sequence that corresponds to a first word registered in the first dictionary, the first dictionary being stored in a memory included in the voice processing apparatus and indicating a corresponding relation between the first word and the first phonemic sequence; extracts, from the first dictionary, the first word corresponding to a highest match degree as a spoken word spoken by the target speaker; corrects a second dictionary based on the highest match degree, the second dictionary indicating a corresponding relation between a second word and a third word, the third word corresponding to a language unit spoken by the target speaker intending to speak the second word; and corrects the second dictionary by correcting the corresponding relation between the third word matching the spoken word and the second word that corresponds to the third word.

With this configuration, the speech of the target speaker is extracted from audio collected by the microphone corresponding to the voice processing apparatus. The speech phonemic sequence configuring the speech is estimated. The match degree between the speech phonemic sequence and the first phonemic sequence that corresponds to the first word registered in the first dictionary is calculated using the first dictionary. The first dictionary is stored in the memory included in the voice processing apparatus and indicates the corresponding relation between the first word and the first phonemic sequence. The first word corresponding to the highest match degree is extracted, from the first dictionary, as the spoken word spoken by the target speaker. The second dictionary is corrected based on the highest match degree. The second dictionary indicates the corresponding relation between the second word and the third word. The third word corresponds to the language unit spoken by the target speaker intending to speak the second word. The second dictionary is corrected by correcting the corresponding relation between the third word matching the spoken word and the second word that corresponds to the third word.

Therefore, the match degree, between the speech phonemic sequence estimated from the speech of the target speaker and the first phonemic sequence that corresponds to the first word, is calculated. Based on the highest match degree, the corresponding relation between the third word matching the spoken word spoken by the target speaker and the second word that corresponds to the third word is corrected. Therefore, the dictionary used in the voice processing apparatus can be corrected according to the language learning stage of the speaker and the voice recognition accuracy can be improved.

(2) In the aspect above, when the spoken word is included in the second dictionary and the highest match degree is at least a first threshold value, the second dictionary may be corrected by deleting, from the second dictionary, a combination of the second word matching the spoken word and the third word that corresponds to the second word.

With this configuration, the spoken word is included in the second dictionary and when the highest match degree is at least the first threshold value, the second dictionary is corrected by deleting, from the second dictionary, the combination of the second word matching the spoken word and the third word that corresponds to the second word.

Therefore, when the highest match degree is at least the first threshold value, the combination between the second word matching the spoken word and the third word corresponding to the second word can be deleted from the second dictionary.

(3) In the aspect above, the second dictionary further includes the corresponding relation between the second word and frequency of the target speaker speaking the third word which matches the spoken word. When the spoken word is registered in the second dictionary as the second word, the highest match degree is at least the first threshold value, and the frequency of the third word that corresponds to the second word which matches the spoken word is at or less than a second threshold value, the second dictionary may be corrected by deleting, from the second dictionary, the combination of the second word matching the spoken word and the third word that corresponds to the second word.

With this configuration, the second dictionary further includes the corresponding relation between the second word and the frequency of the target speaker speaking the third word which matches the spoken word. When the spoken word is registered in the second dictionary as the second word, the highest match degree is at least the first threshold value, and the frequency of the third word that corresponds to the second word which matches the spoken word is at or less than the second threshold value, the second dictionary is corrected by deleting, from the second dictionary, the combination of the second word matching the spoken word and the third word that corresponds to the second word.

Therefore, when the highest match degree is at least the first threshold value, and the frequency of the third word that corresponds to the second word which matches the spoken word is at or less than the second threshold value, the combination of the second word matching the spoken word and the third word that corresponds to the second word is deleted from the second dictionary, and therefore, the combination of the second word which the speaker mastered and the third word can be deleted more accurately.

(4) In the aspect above, the target speaker is a target child who is an object of voice recognition in the voice processing apparatus. By comparing a voiceprint extracted from the speech and the voiceprint of the target child previously recorded in the memory, it is determined whether or not the speaker is the target child. When the speaker is determined to be the target child, the speech phonemic sequence may be estimated.

With this configuration, the target speaker is the target child who is the object of the voice recognition in the voice processing apparatus. By comparing the voiceprint extracted from the speech and the voiceprint of the target child previously recorded in the memory, it is determined whether or not the speaker is the target child. When the speaker is determined to be the target child, the speech phonemic sequence is estimated.

Therefore, the dictionary used in the voice processing apparatus can be corrected according to the language learning stage of the child.

(5) In the aspect above, the memory further stores a history table indicating the corresponding relation between the first word and the match degree, and when a process of recording the first word corresponding to the highest match degree in association with the match degree in the history table is repeated a predetermined number of times, the second dictionary may be corrected, based on the match degree in the history table, by correcting the corresponding relation between the second word and the third word registered in the second dictionary.

With this configuration, the memory further stores the history table indicating the corresponding relation between the first word and the match degree. When the process of recording the first word corresponding to the highest match degree in association with the match degree in the history table is repeated the predetermined number of times, the second dictionary is corrected, based on the match degree in the history table, by correcting the corresponding relation between the second word and the third word registered in the second dictionary.

Therefore, by repeating the process of recording the first word corresponding to the highest match degree in association with the match degree in the history table the predetermined number of times, the match degree can be calculated more accurately and the dictionary used in the voice processing apparatus can be corrected more precisely.

(6) Another aspect of the present invention is a program for correcting a dictionary used in a voice processing apparatus. The program causes a processer to perform operations which include; extracting a speech of a target speaker from audio collected from a microphone corresponding to the voice processing apparatus; estimating a speech phonemic sequence configuring the speech; calculating a match degree, using a first dictionary, between the speech phonemic sequence and a first phonemic sequence that corresponds to a first word registered in the first dictionary, the first dictionary being stored in a memory included in the voice processing apparatus and indicating a corresponding relation between the first word and the first phonemic sequence; extracting, from the first dictionary, the first word corresponding to a highest match degree as a spoken word spoken by the target speaker; correcting a second dictionary based on the highest match degree, the second dictionary indicating a corresponding relation between a second word and a third word, the third word corresponding to a language unit spoken by the target speaker intending to speak the second word; and correcting the second dictionary by correcting the corresponding relation between the third word matching the spoken word and second word that corresponds to the third word.

With this configuration, the speech of the target speaker is extracted from audio collected by the microphone corresponding to the voice processing apparatus. The speech phonemic sequence configuring the speech is estimated. The match degree, using the first dictionary, between the speech phonemic sequence and the first phonemic sequence that corresponds to the first word registered in the first dictionary is calculated. The first dictionary is stored in the memory included in the voice processing apparatus and indicates the corresponding relation between the first word and the first phonemic sequence. The first word corresponding to the highest match degree is extracted, from the first dictionary, as the spoken word spoken by the target speaker. The second dictionary is corrected based on the highest match degree. The second dictionary indicates the corresponding relation between the second word and the third word. The third word corresponds to the language unit spoken by the target speaker intending to speak the second word. The second dictionary is corrected by correcting the corresponding relation between the third word matching the spoken word and the second word that corresponds to the third word.

Therefore, the match degree, between the speech phonemic sequence estimated from the speech of the target speaker and the first phonemic sequence that corresponds to the first word, is calculated. Based on the highest match degree, the corresponding relation between the third word matching the spoken word spoken by the target speaker and the second word that corresponds to the third word is corrected. Therefore, the dictionary used in the voice processing apparatus can be corrected according to the language learning stage of the speaker and the voice recognition accuracy can be improved.

(7) A voice processing apparatus according to another aspect of the present disclosure includes a processor and a memory. The processor extracts a speech of a target speaker from audio collected by a microphone corresponding to the voice processing apparatus; estimates a speech phonemic sequence configuring the speech; calculates a match degree, using a first dictionary, between the speech phonemic sequence and a first phonemic sequence that corresponds to a first word registered in the first dictionary, the first dictionary being stored in a memory included in the voice processing apparatus and indicating a corresponding relation between the first word and the first phonemic sequence; extracts, from the first dictionary, the first word corresponding to a highest match degree as a spoken word spoken by the target speaker; corrects a second dictionary based on the highest match degree, the second dictionary indicating a corresponding relation between a second word and a third word, the third word corresponding to a language unit spoken by the target speaker intending to speak the second word; and corrects the second dictionary by correcting the corresponding relation between the third word matching the spoken word and the second word that corresponds to the third word.

With this configuration, the voice processing apparatus includes the processor and the memory. The speech of the target speaker is extracted from audio collected by the microphone corresponding to the voice processing apparatus. The speech phonemic sequence configuring the speech is estimated. The match degree, using the first dictionary, between the speech phonemic sequence and the first phonemic sequence that corresponds to the first word registered in the first dictionary is calculated. The first dictionary is stored in the memory included in the voice processing apparatus and indicates the corresponding relation between the first word and the first phonemic sequence. The first word corresponding to the highest match degree is extracted, from the first dictionary, as the spoken word spoken by the target speaker. The second dictionary is corrected based on the highest match degree. The second dictionary indicates the corresponding relation between the second word and the third word. The third word corresponds to the language unit spoken by the target speaker intending to speak the second word. The second dictionary is corrected by correcting the corresponding relation between the third word matching the spoken word and the second word that corresponds to the third word.

Therefore, the match degree between the speech phonemic sequence estimated from the speech of the target speaker and the first phonemic sequence that corresponds to the first word is calculated. Based on the highest match degree, the corresponding relation between the third word matching the spoken word spoken by the target speaker and the second word that corresponds to the third word is corrected. Therefore, the dictionary used in the voice processing apparatus can be corrected according to the language learning stage of the speaker and the voice recognition accuracy can be improved.

(8) A robot according to another aspect of the present disclosure includes the above mentioned voice processing apparatus, a casing in which the voice processing apparatus being incorporated, and a displacement mechanism displacing the casing.

With this configuration, the voice processing apparatus can be applied to the robot.

In addition, the present disclosure can provide, not only the method to correct the dictionary which performs characteristic processes mentioned above, but also the voice processing apparatus having a processor to perform characteristic steps included in the method of correcting the dictionary. Further, a computer can execute, each characteristic step included in the method of correcting the dictionary, as a computer program. Of course, such a computer program can be distributed via a communication network such as the Internet or a non-transitory computer-readable record medium such as a CD-ROM.

Embodiments according to the present disclosure are described with reference to the drawings below. Moreover, each of the embodiments described below indicates a specific example of the present disclosure. Numerical values, shapes, configuration elements, steps, the order of the steps, and the like described in the embodiments below are only an example and is not limited to the present disclosure. Furthermore, among the configuration elements for the following embodiments, the configuration elements which are not described in the independent claims indicating the highest concept is described as arbitrary configuration elements. In addition, in all the embodiments, each of contents can be combined.

First Embodiment

FIG. 1 illustrates an exemplary overall configuration of a voice interaction system according to a first embodiment. The voice interaction system shown in FIG. 1 includes a voice inputter 100, a voice interaction processing apparatus 200, and a voice outputter 300.

The voice inputter 100 is a directional microphone, for example, and may be incorporated into a terminal or a robot on which the voice interaction processing apparatus 200 is mounted. In addition, the voice inputter 100 may be any sound collecting device such as a hand microphone, a pin microphone, or a desktop microphone, for example, and may be connected, wired or wirelessly, to a terminal on which the voice interaction processing apparatus 200 is mounted. Further, the voice inputter 100 may input voice using a device having sound collecting and communication functions, such as a smartphone and a tablet terminal.

The voice interaction processing apparatus 200 includes a CPU (central processing unit) 20 and a memory 30. The CPU 20 includes a speech extractor 201, a target child determiner 202, a voice recognizer 203, an intention reader 204, a response generator 205, a voice synthesizer 206, a history information updater 207, a correction rule registrar 208, and a dictionary updater 209. The memory 30 includes a child vocabulary dictionary 301, a misrecognition correction dictionary 302, a recognition history table 303, and a correction history table 304.

A program performing a voice interaction process is stored in the memory 30 which is incorporated in the robot or the terminal to perform voice interaction and is executed by an operation device such as the CPU 20. In addition, all elements configuring the voice interaction processing apparatus 200 may be mounted on the same terminal or may be mounted separately on a different terminal or on a server which is connected via an arbitrary network such as an optical fiber, a radio, or a public telephone line. The voice interaction process may be performed by a mutual communication between the voice interaction processing apparatus 200 and the different terminal or the server.

The speech extractor 201 extracts a speech of a target speaker from audio collected by the voice inputter 100.

The target child determiner 202 determines whether or not the speaker of the speech extracted from the speech extractor 201 is the target speaker who is an object of voice recognition. The target speaker is a target child who is the object of the voice recognition. In addition, a child is at least 1 year old but less than 6 years old or of preschool age, for example. The target child determiner 202 determines whether or not the speaker is the target child by comparing a voiceprint extracted from the speech and the voiceprint of the target child previously recorded in the memory 30. The memory 30 stores the voiceprint of the target child.

The child vocabulary dictionary (first dictionary) 301 is a dictionary in which words commonly spoken by the child are registered. FIG. 2 illustrates an example of the child vocabulary dictionary according to the first embodiment. The child vocabulary dictionary 301 indicates a corresponding relation between a word (first word) and a phonemic sequence (first phonemic sequence). As shown in FIG. 2, in the child vocabulary dictionary 301, the word (first word) and the phonemic sequence (first phonemic sequence) configuring the word are registered in association. For example, the word "apple" is associated with the registered phonemic sequence "/'apəl/".

The misrecognition correction dictionary 302 (second dictionary) is a dictionary in which a combination of a misrecognized word and a corrected word that is a result of correcting the misrecognized word is registered as a correction rule. FIG. 3 illustrates an example of the misrecognition correction dictionary according to the first embodiment. The misrecognition correction dictionary 302 indicates the corresponding relation between the corrected word (second word) and the misrecognized word (third word) that corresponds to a language unit spoken by the target speaker intending to speak the corrected word. As shown in FIG. 3, in the misrecognition correction dictionary 302, the misrecognized word and the corrected word are registered in association. For example, the corrected word "sweet" is associated with the misrecognized word "sweep". In other words, when the target child intending to speak "sweet" cannot speak correctly and speaks the language unit different from "sweet", and the voice recognizer 203 outputs the recognition result as "sweep" by the child vocabulary dictionary 301, the misrecognized word "sweep" is converted to the corrected word "sweet".

The voice recognizer 203 recognizes the spoken word by the target child by receiving voice data input by the voice inputter 100 and referring to the child vocabulary dictionary 301 and the misrecognition correction dictionary 302.

When the target child determiner 202 determines that the speaker is the target child (target speaker), the voice recognizer 203 estimates, from the speech, the phonemic sequence configuring the speech. The voice recognizer 203 calculates a match degree, using the child vocabulary dictionary 301, between the phonemic sequence (speech phonemic sequence) and the phonemic sequence (first phonemic sequence) that corresponds to the word (first word) registered in the child vocabulary dictionary (first dictionary) 301. The match degree is obtained by calculating similarity between the estimated phonemic sequence and the registered phonemic sequence of the word registered in the child vocabulary dictionary 301. For example, the match degree can use a similarity degree from an editing distance such as Levenshtein distance or Dynamic Time Warping.

The voice recognizer 203 extracts the word corresponding to the highest match degree (first word), from the child vocabulary dictionary (first dictionary) 301, as the spoken word spoken by the target child (target speaker).

The voice recognizer 203 determines whether or not the word extracted from the child vocabulary dictionary 301 is registered in the misrecognition correction dictionary 302 as the misrecognized word. When it is determined that the word extracted from the child vocabulary dictionary 301 is registered in the misrecognition correction dictionary 302 as the misrecognized word, the voice recognizer 203 converts the word extracted from the child vocabulary dictionary 301 to the corrected word which is associated with the misrecognized word which is identical to the extracted word, and then outputs the corrected word as the recognition result. Furthermore, when it is determined that the word extracted from the child vocabulary dictionary 301 is not registered in the misrecognition correction dictionary 302 as the misrecognized word, the voice recognizer 203 outputs the word extracted from the child vocabulary dictionary 301 as the recognition result.

The intention reader 204 analyzes the content spoken by the user based on the recognition result obtained by the voice recognizer 203. As for a method of intention reading, a rule-based method which understands the speech content based on a predetermined rule in order to determine a task executable by the voice interaction system, a method which understands the speech content using a statistical method such as machine learning, or the like can be adopted.

The response generator 205 generates, from the intention reading result output by the intention reader 204, text information for responding speech to respond to the user.

The voice synthesizer 206 converts the text information for responding speech generated by the response generator 205 to voice data using a voice synthesizing process.

The history information updater 207 updates the recognition history table 303 and the correction history table 304 when the voice recognition process is performed by the voice recognizer 203.

In the recognition history table 303, the word and a mastery level are registered, the mastery level is a basis to determine the level of the target child mastering the word. FIG. 4 is an example of the recognition history table according to the first embodiment. The match degree of the word included in the voice recognition process result is used as the mastery level. The recognition history table 303 indicates corresponding relation between the word extracted from the child vocabulary dictionary 301 and the mastery level (match degree) of the word.

The voice recognizer 203 outputs to the history information updater 207 the word extracted from the child vocabulary dictionary 301 and the match degree of the word. The history information updater 207 stores in the recognition history table 303 the word (the first word having the match degree corresponding to the highest registered phonemic sequence) extracted from the child vocabulary dictionary 301 using the voice recognizer 203 associating with the match degree of the word. As shown in FIG. 4, in the recognition history table 303, the word and the mastery level (match degree) are registered while associated with each other. For example, the word "sweep" is associated with the mastery level "0.5".

In the correction history table 304, a correction rule registered in the misrecognition correction dictionary 302 and a timestamp indicating the date when the correction rule was applied during the voice recognition are registered. FIG. 5 is an example of the correction history table according to the first embodiment. In the correction history table 304, the misrecognized word, the corrected word, and the timestamp indicating the date when the misrecognized word is converted to the corrected word are provided correspondingly. The timestamp may be a date when the target child (target speaker) spoke the misrecognized word intending to speak the corrected word.

The voice recognizer 203 outputs the misrecognized word and the corrected word to the history information updater 207 when the misrecognized word is converted to the corrected word. When the misrecognized word is converted to the corrected word by the voice recognizer 203, the history information updater 207 stores in the correction history table 304 the misrecognized word, the corrected word, and the timestamp indicating the date when the misrecognized word is converted to the corrected word are provided correspondingly. As shown in FIG. 5, in the correction history table 304, the misrecognized word, the corrected word, and the timestamp are registered in association. For example, the misrecognized word "sweep" and the corrected word "sweet" are associated with the timestamp "20160401" indicating Apr. 1, 2016.

According to the present embodiment, the correction history table 304 stores the misrecognized word, the corrected word, and the timestamp associating with one another. However, the present disclosure is not limited to this in particular, and the misrecognition correction dictionary 302 may store the misrecognized word, the corrected word, and the timestamp associating with one another.

The correction rule registrar 208 determines whether or not the interaction with the target child is established based on the result of the intention reading by the intention reader 204. When it is determined that the interaction with the target child is not established, the correction rule registrar 208 records the speech content which did not establish the interaction. Further, the correction rule registrar 208 plays the recorded voice data of the target child speaking to a parent, for example, and understands the speech content of the target child by asking for the speech content which did not establish the interaction, and then obtains the corrected content of the misrecognized portion. Accordingly, the correction rule registrar 208 obtains the correction rule to correct the misrecognition and registers the correction rule to the misrecognition correction dictionary 302.

The dictionary updater 209 deletes the correction rule of the word that has been mastered by the target child from the misrecognition correction dictionary 302 based on the information recorded in the recognition history table 303 and the correction history table 304. The dictionary updater 209 corrects the misrecognition correction dictionary 302 (second dictionary) based on the highest match degree. The misrecognition correction dictionary 302 is corrected by correcting the corresponding relation between the misrecognized word matching with the spoken word and the corrected word corresponding to the misrecognized word. When the spoken word is included in the misrecognition correction dictionary (second dictionary) 302 and the highest match degree is at least a first threshold value, the dictionary updater 209 deletes a combination of the misrecognized word matching with the spoken word and the corrected word corresponding to the misrecognized word from the misrecognition correction dictionary 302 (second dictionary). An updating method of the misrecognition correction dictionary 302 is described below with reference to FIG. 7.

The voice outputter 300 is a speaker, for example, and outputs the voice data generated by the voice synthesizer 206. The voice outputter 300 may be incorporated into the terminal or the robot on which the voice interaction processing apparatus 200 is mounted, or may be connected, wired or wirelessly, to the terminal on which the voice interaction processing apparatus 200 is mounted. Further, the voice outputter 300 may be the speaker mounted on the device having the sound collecting and communication functions, such as the smartphone and the tablet terminal.

Figure 6:
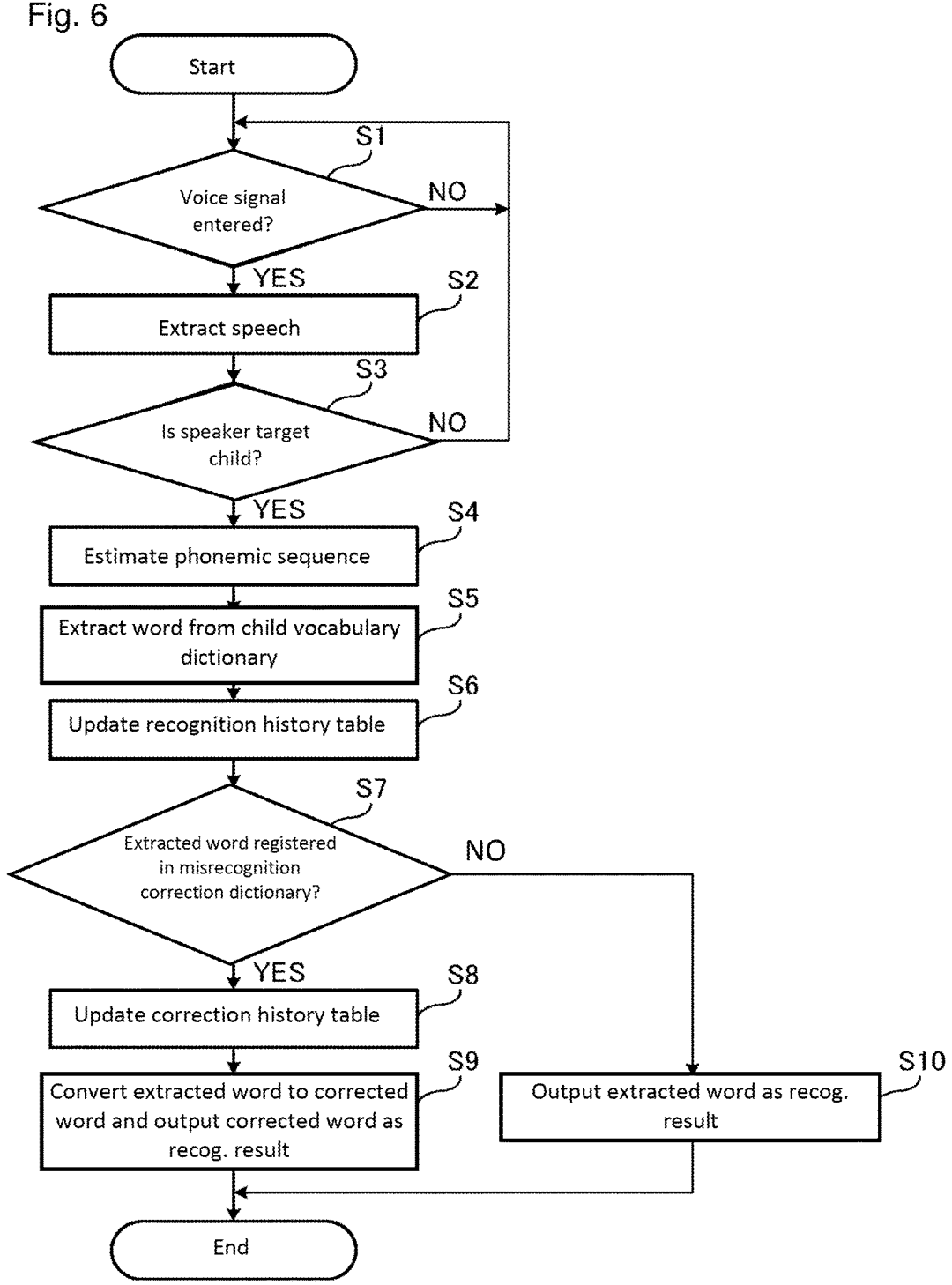
FIG. 6 is a flow chart illustrating a voice recognition process according to the first embodiment.

FIG. 6 is a flow chart illustrating the voice recognition process according to the first embodiment of the present disclosure. With reference to FIG. 6, the voice recognition process of the target child is described.

First, the speech extractor 201 determines whether or not the voice signal is entered from the voice inputter 100 (step S1). When it is determined that the voice signal is not entered (NO in step S1), the process in step S1 is repeated until the voice signal is entered.

On the other hand, when it is determined that the voice signal is entered (YES in step S1), the speech extractor 201 extracts the speech from the voice signal (step S2).

Next, the target child determiner 202 determines whether or not the speaker of the speech extracted from the speech extractor 201 is the target child (step S3). At this time, the target child determiner 202 determines whether or not the speaker is the target child by comparing the voiceprint extracted from the speech and the voiceprint of the target child previously recorded in the memory 30. When it is determined that the speaker is not the target child (NO in step S3), the process is returned to step S1.

On the other hand, when it is determined that the speaker is the target child (YES in step S3), the voice recognizer 203 estimates the phonemic sequence configuring the speech by an acoustic model (step S4). For example, when the target child speaks "apple sweep", estimated phonemic sequence is "/'apəl//swēp/".

Next, the voice recognizer 203 compares the estimated phonemic sequence and the registered phonemic sequence which is registered in the child vocabulary dictionary 301 and extracts, from the child vocabulary dictionary 301, the word corresponding to the registered word string having the highest match degree with the estimated phonemic sequence (step S5). The voice recognizer 203 outputs the extracted word as the recognition result. For example, in the child vocabulary dictionary 301 shown in FIG. 2, when the Levenshtein distance is used for match degree, the Levenshutein distance between the estimated phonemic sequence "/swēp/" and the registered word string "sweep" is 0.2 and the Levenshutein distance between the estimated phonemic sequence "/swēp/" and the registered word string "sweet" is 0.6. Since the similarity between the two phonemic sequences is higher as the number of the Levenshutein distance is smaller, "apple sweep" is the recognition result.

Next, the history information updater 207 registers the match degree of the word extracted from the child vocabulary dictionary 301 as the mastery level corresponding to the word identical to the extracted word, and updates the recognition history table 303 (step S6). For example, when using the Levenshutein distance as the match degree, the similarity is higher as the Levenshutein distance value is smaller. Accordingly, the history information updater 207 registers a value extracting the Levenshutein distance from 1 as the mastery level, in order to bring the similarity level higher as the value becomes larger. When an entry associating the word with the mastery level is not stored in the recognition history table 303, the history information updater 207 creates a new entry associating the word with the mastery level in the recognition history table 303.

Next, the voice recognizer 203 searches the misrecognition correction dictionary 302 and determines whether or not the extracted word is registered as the misrecognized word in the misrecognition correction dictionary 302 (step S7). When it is determined that the extracted word is registered in the misrecognition correction dictionary 302 (Yes in step S7), the history information updater 207 changes the timestamp corresponding to the misrecognized word in the correction history table 304 to the current date and updates the correction history table 304 (step S8). When the entry associating with the misrecognized word, the corrected word, and the timestamp is not stored in the correction history table 304, the history information updater 207 creates the new entry associating with the misrecognized word, corrected word, and the timestamp in the correction history table 304.

Next, the voice recognizer 203 coverts the extracted word from the child vocabulary dictionary 301 to the corrected word associated with the misrecognized word identical to the extracted word and outputs the converted corrected word as the recognition result (step S9). The process in steps S8 and S9 may be switched.

On the other hand, when it is determined that the extracted word is not registered in the misrecognition correction dictionary 302 (NO in step S7), the voice recognizer 203 outputs the extracted word from the child vocabulary dictionary 301 as the recognition result (step S10).

Figure 7:
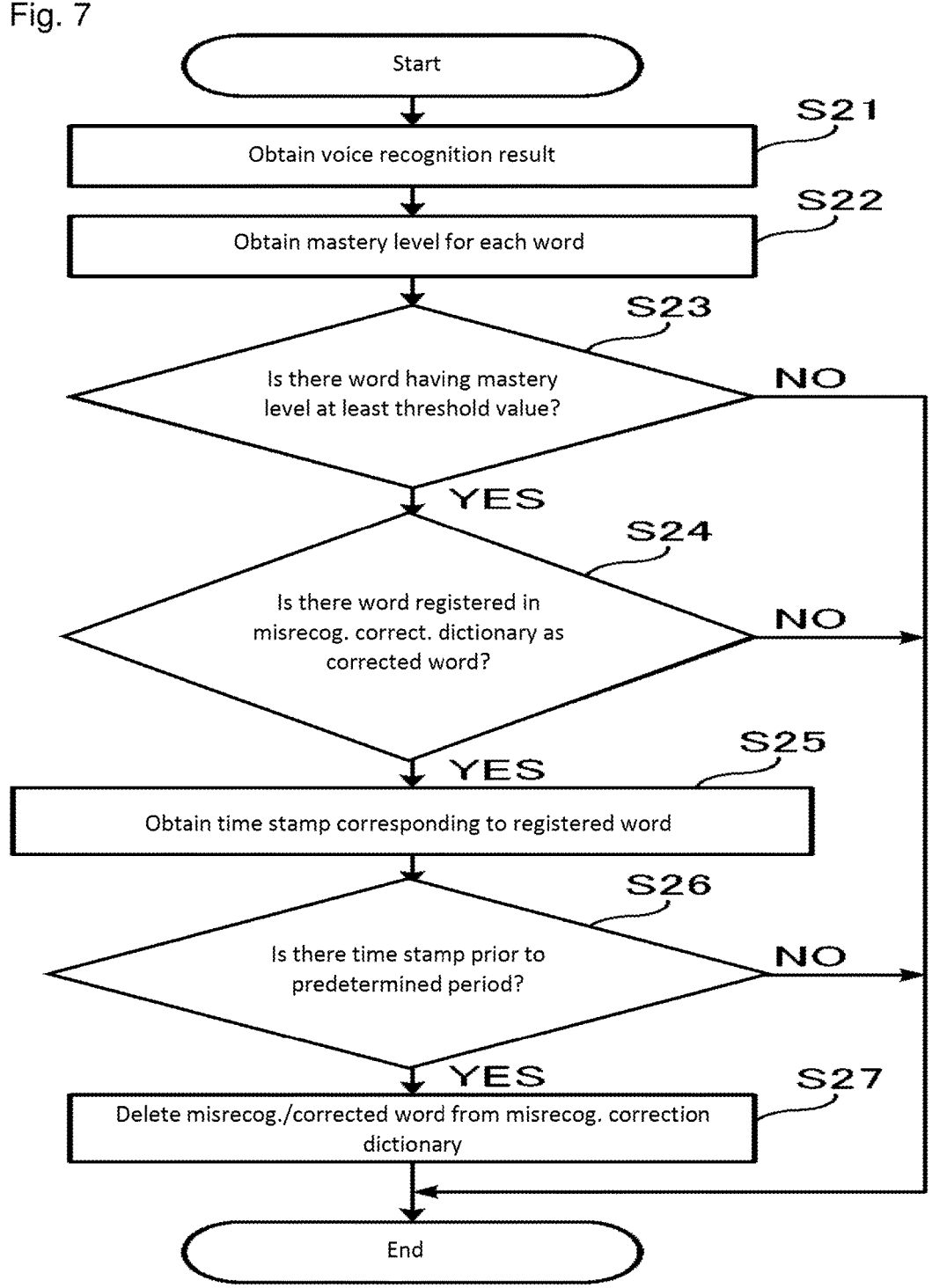
FIG. 7 is a flow chart illustrating a revision process of the misrecognition correction dictionary according to the first embodiment.

FIG. 7 is a flow chart illustrating a correction process of the misrecognition correction dictionary according to the first embodiment of the present invention. With FIG. 7, removing the correction rule registered in the misrecognition correction dictionary 302 by the dictionary updater 209 is described.

The dictionary updater 209 obtains the recognition result from the voice recognizer 203 (step S21).

Next, the dictionary updater 209 obtains, with reference to the recognition history table 303, the mastery level for each word included in the recognition result (step S22). For example, when the recognition result is "apple sweet", the dictionary updater 209 refers to the recognition history table 303 for each word of "apple" and "sweet" and obtains the mastery level for each word. In the example of the recognition history table 303 in FIG. 4, the mastery level for "apple" is 0.9 and the mastery level for "sweet" is 0.8.

Next, the dictionary updater 209 determines whether or not there is a word with the obtained mastery level being at least the threshold value (step S23). When it is determined that there is no word with the mastery level being at least the threshold value (NO in step S23), the process ends.

On the other hand, when there is a word with the mastery level being at least the threshold value (YES in step S23), the dictionary updater 209 determines, from words with the mastery level being at least the threshold value, whether or not there is a word registered in the misrecognition correction dictionary 302 as a corrected word (step S24). The dictionary updater 209 determines that the word having at least the threshold value means that the child has learned how to speak and the word becomes a candidate to be removed from the correction rule. For example, when the threshold value of the mastery level is set at 0.7 to determine that the child can speak the word, in the example of the recognition history table 303 in FIG. 4, the mastery levels of the words "apple" and "sweet" are both above 0.7, so the two words are candidates to be removed from the correction rule. The word, which is chosen to be the candidate to be removed from the correction rule, is checked whether the word is registered in the misrecognition correction dictionary 302 as the corrected word.

When it is determined that there is no word in the misrecognition correction dictionary 302 registered as the corrected word (NO in step S24), the process ends because the correction rule is not registered in the misrecognition correction dictionary 302. For example, in the case of the misrecognition correction dictionary 302 in FIG. 3, it is determined that "apple" is not registered as the corrected word and "sweet" is registered as the corrected word.

On the other hand, when it is determined that there is a word in the misrecognition correction dictionary 302 registered as a corrected word (YES in step S24), the dictionary updater 209 obtains, from the correction history table 304, the timestamp corresponding to the word registered in the misrecognition correction dictionary 302 as the corrected word (step S25). The timestamp indicates the date on which the correction rule was last applied.

Next, the dictionary updater 209 determines, from the timestamps obtained, whether or not there is a timestamp older than a predetermined period which is set in advance (step S26). When it is determined that there is no timestamp older than the predetermined period (NO in step S26), the process ends.

On the other hand, when it is determined that there is a timestamp older than the predetermined period (YES in step S26), the dictionary updater 209 determines that the misrecognized word and the corrected word corresponding to the timestamp older than the predetermined period are not being used and removes from the misrecognition correction dictionary 302 the misrecognized word and the corrected word corresponding to the timestamp (step S27). The predetermined period to determine that the correction rule is not being used (the misrecognized word and the corrected word corresponding to the timestamp older than the predetermined period) is one month, for example.

For example, in the case of the misrecognition correction dictionary 302 in FIG. 3, "sweet" (corrected word) is registered in association with the "sweep" (misrecognized word), and therefore, the dictionary updater 209 refers to the correction history table 304. The timestamp corresponding to "sweet" (corrected word), which is recorded in the dictionary updater 209 in FIG. 5, is "20160401" (Apr. 1, 2016). When the current date is Jun. 20, 2016, the dictionary updater 209 determines that the correction rule is not applied more than a month and removes the correction rule to correct "sweep" to "sweet".

When the distance, between the recognition phonemic sequence such as Levenshtein distance and the phonemic sequence of the dictionary registration word, is used as the mastery level, the shorter the distance is, the more similar it is determined to be. Therefore, when the mastery level is smaller than the threshold value arranged in step S23, determination can be made that the correct speech has been mastered. A criterion for determining whether or not the correct speech is mastered depends on the value applied as the mastery level.

Figure 8:
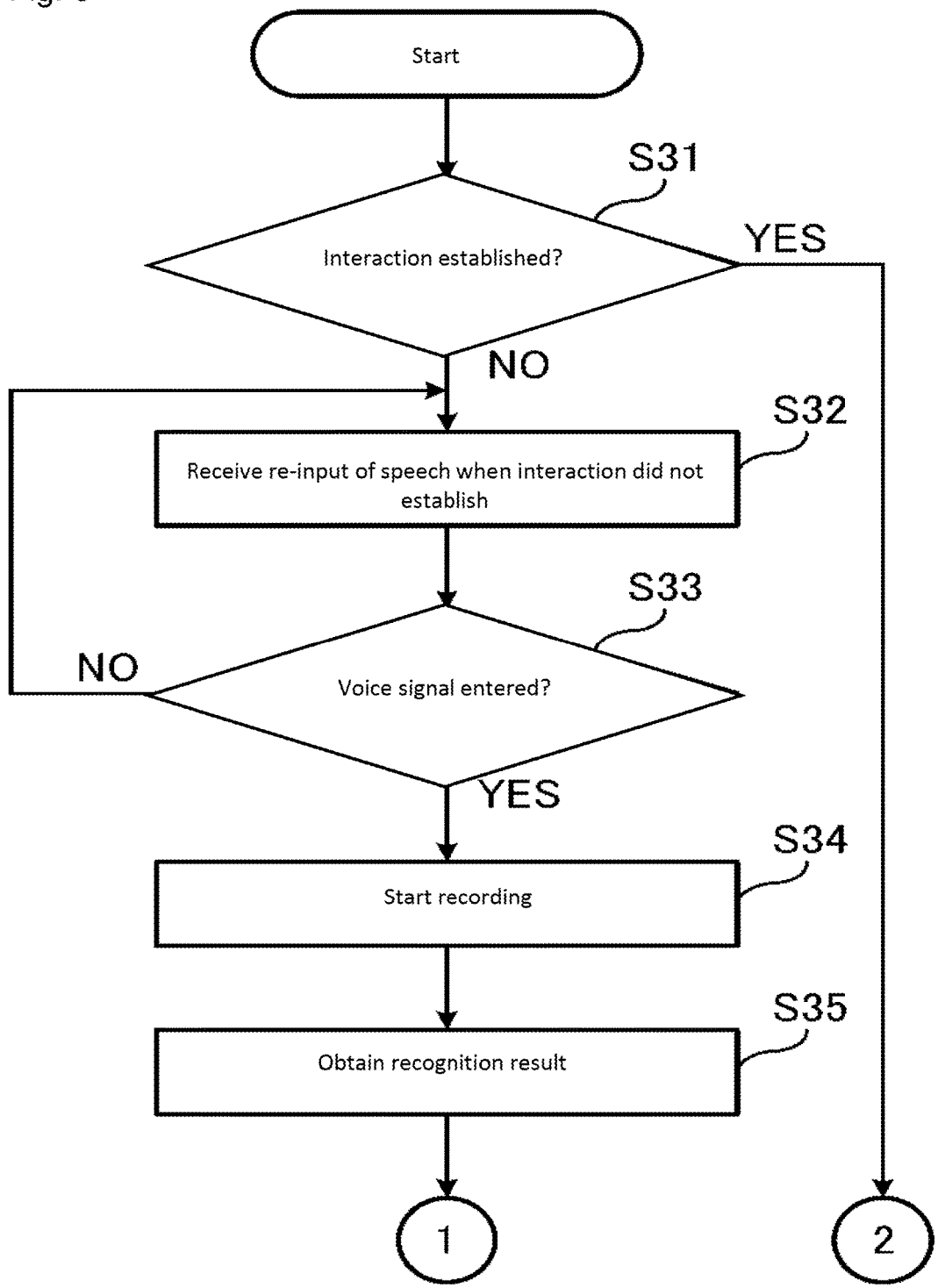
FIG. 8 is a first flow chart illustrating a registration process of a misrecognized word and a corrected word which are not registered in the misrecognition correction dictionary according to the first embodiment.
Figure 9:
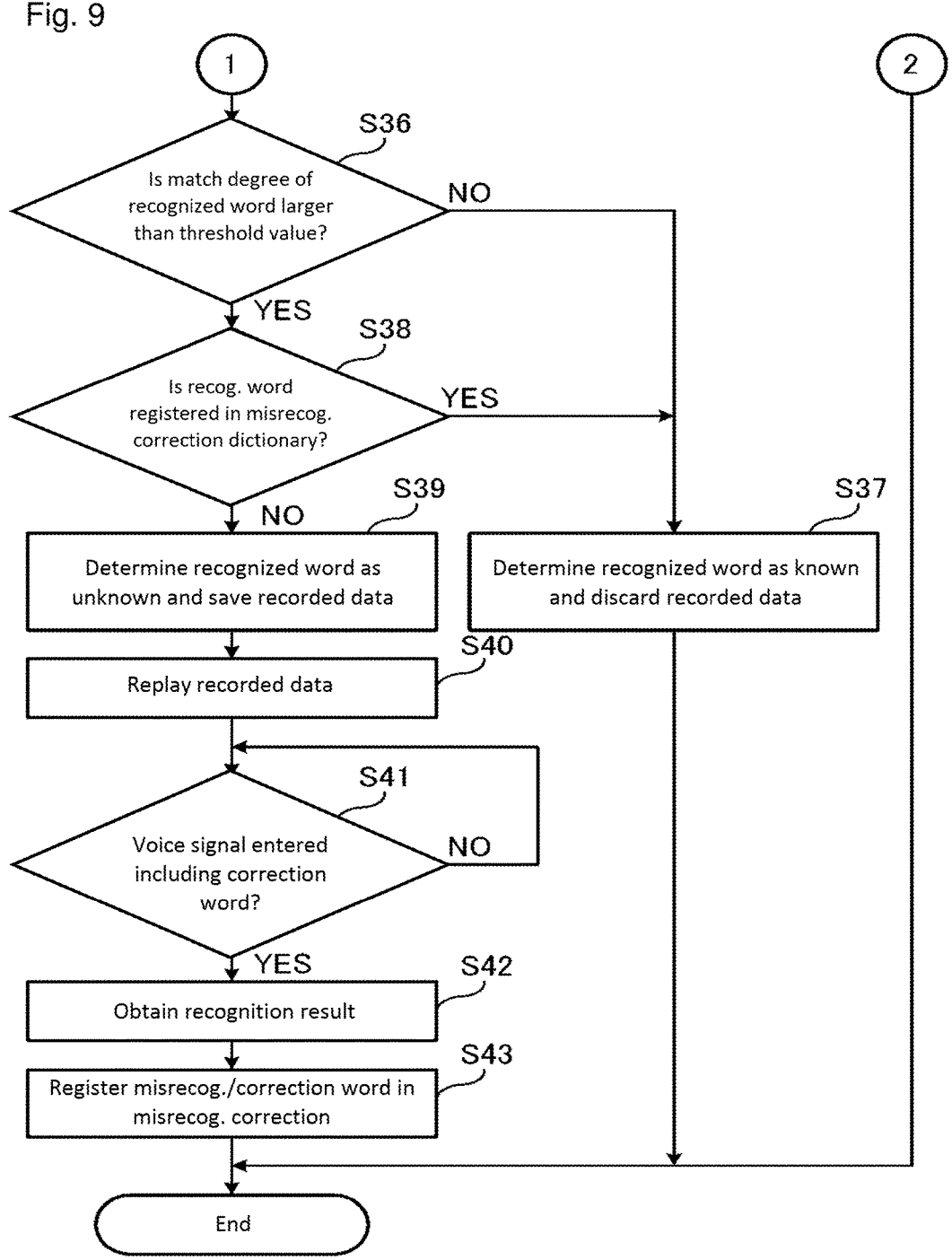
FIG. 9 is a second flow chart illustrating the registration process of the misrecognized word and the corrected word which are not registered in the misrecognition correction dictionary according to the first embodiment.

FIG. 8 is a first flow chart illustrating a registration process of the misrecognized word and the corrected word which are not registered in the misrecognition correction dictionary according to the first embodiment; and FIG. 9 is a second flow chart illustrating the registration process of the misrecognized word and the corrected word which are not registered in the misrecognition correction dictionary according to the first embodiment. With FIGS. 8 and 9, the registration of the misrecognized word and the corrected word which are not registered in the misrecognition correction dictionary 302 using the correction rule registrar 208 is described.

First, the correction rule registrar 208 determines whether or not the interaction with the target child is established based on the result of intention reading by the intention reader 204 (step S31). When it is determined that the interaction is established, (Yes in step S31), the process ends.

On the other hand, when it is determined that the interaction is not established (NO in step S31), the correction rule registrar 208 receives re-input of the speech which did not establish the interaction (step S32). The correction rule registrar 208 causes the voice outputter 300 to output the audio encouraging the target child to reproduce the speech which did not establish the interaction. The target child reproduces the speech which did not establish the interaction according to the audio output by the voice inputter 300.

Next, the speech extractor 201 determines whether or not the voice signal is entered from the voice inputter 100 (step S33). When it is determined that the voice signal is not entered (NO in step S33), the process returns to step S32 and steps S32 and S33 are repeated until the voice signal is entered.

On the other hand, when it is determined that the voice signal is entered (Yes in step S33), the correction rule registrar 208 starts recording the voice signal which is entered by the voice inputter 100 (step S34). The recorded data is stored in the memory 30.

Next, the correction rule registrar 208 obtains the recognition result from the voice recognizer 203 (step S35). At this time, the process from the voice signal being entered until the voice recognizer 203 outputs the recognition result is the same process from step S2 to step S5 in FIG. 6. In other words, the speech extractor 201 extracts the speech from the voice signal and the target child determiner 202 determines whether or not the speaker of the speech extracted by the speech extractor 201 is the target child. When it is determined that the speaker is the target child, the voice recognizer 203 estimates the phonemic sequence configuring the speech using the acoustic model. Next, the voice recognizer 203 compares the estimated phonemic sequence and the registered phonemic sequence which is registered in the child vocabulary dictionary 301 and extracts from the child vocabulary dictionary 301 the word corresponding to the registered phonemic sequence having the highest match degree with the estimated phonemic sequence. Then, the voice recognizer 203 outputs the extracted word as the recognition result.

The correction rule registrar 208 determines whether or not the match degree of the recognized word (recognition result) is larger than the threshold value (step S36). At this time, preferably, the threshold value is smaller than the threshold value which is used for the determination process in step S23 in FIG. 7. In other words, when the threshold value used for determining in step S23 in FIG. 7 is 0.7, for example, the threshold value used for determining in step S36 is preferably 0.4, for example (step S37).

When it is determined that the match degree of the recognized word is at or below the threshold value (NO in step S36), the correction rule registrar 208 determines that the recognized word is a known word and discards the recorded data.

On the other hand, when it is determined that the match degree of the recognized word is larger than the threshold value (YES in step S36), the correction rule registrar 208 determines whether the recognized word is registered as the misrecognized word in the misrecognition correction dictionary 302 (step S38). When it is determined that the recognized word is registered as the misrecognized word in the misrecognition correction dictionary 302 (YES in step S38), the process shifts to step S37.

On the other hand, when it is determined that the recognized word is not registered as the misrecognized word in the misrecognition correction dictionary 302 (NO in step S38), the correction rule registrar 208 determines that the recognized word is an unknown word which is not registered in the misrecognition correction dictionary 302 and saves the recorded data (step S39). In this way, the recorded data of the speech of the target child is saved, the data including the word that needs to be registered as the misrecognized word in the misrecognition correction dictionary 302.

Next, the correction rule registrar 208 replays the recorded data (step S40). Moreover, the process of step S40 is not required to perform continuously after the process of step S39. The process of step S40 can be performed anytime as long as the recorded data has been saved. For example, a parent of the target child listens to the recorded data which is replayed and speaks the corrected word which is the corrected word spoken by the target child.

Next, the speech extractor 201 determines whether or not the voice signal is entered from the voice inputter 100 (step S41). When it is determined that the voice signal is not entered (NO in step S41), the process in step S41 is repeated until the voice signal is entered.

On the other hand, when it is determined that the voice signal is entered (YES in step S41), the correction rule registrar 208 obtains the recognition result from the voice recognizer 203 (step S42). At this time, the speech extractor 201 extracts the speech from the voice signal. The speaker is not the target child and therefore, the process to determine whether the speaker is the target child is not performed by the target child determiner 202. The voice recognizer 203 estimates the phonemic sequence configuring the speech by the acoustic model. Next, the voice recognizer 203 compares the estimated phonemic sequence and the registered phonemic sequence registered in the child vocabulary dictionary 301 and extracts from the child vocabulary dictionary 301 the word corresponding to the registered word string having the highest match degree with the estimated phonemic sequence. Then, the voice recognizer 203 outputs the extracted word as the recognition result.

Next, the correction rule registrar 208 makes the recognition word obtained in step S35 as the misrecognized word and makes the recognition word which is the recognition result obtained in step S42 as the corrected word, and then, registers in the misrecognition correction dictionary 302 the misrecognized word and the corrected word in association with each other (step S43).

FIG. 10 illustrates an example of the detailed interaction between the target child and the voice interaction system according to the first embodiment. FIG. 10 shows an example when the interaction did not establish between the target child and the voice interaction system. In FIG. 10, the speech by the target child is indicated by "C" and the response from the voice interaction system is indicated by "S".

In the speech C1, the target child meant to say "Apple sweet", however, the target child actually speaks "Apple sweep". Meanwhile, the voice interaction system misrecognizes as "apple sweep", so the voice interaction system responds as "Sweep the apple?" in the response S1. At this time, since the response is different from the word intended by the speaker, the target child makes a negative comment as "No" in the speech C2. To this, the voice interaction system asks "Say it again" in the response S2. Then, the target child speaks again "Apple sweep" in the speech C3. When recognized again as "Apple sweep", the voice interaction system determines the recognition result as the misrecognition.

At this time, the correction rule registrar 208 records the interaction with the target child at the timing of prompting to reproduce the speech. When determined as misrecognition, the correction rule registrar 208 replays the recorded audio to the parent and speaks "is it trying to say "apple sweep?" what is the correct meaning of "apple sweep?"" to promote the parent to speak the correct meaning. The voice interaction system learns that "sweep" is "sweet" when the parent speaks "Apple sweet" with the correct meaning. The correction rule registrar 208 registers the correction rule to correct "sweep" to "sweet" in the misrecognition correction dictionary 302.

According to the voice interaction system in the first embodiment mentioned above. The dictionary updater 209 determines whether or not the target speaker mastered the correct speech of the word based on the mastery level of the word recorded in the recognition history table 303 and the correction frequency recorded in the correction history table 304. When it is determined that the target child has mastered the correct speech, the correction rule (misrecognized word and corrected word) registered in the misrecognition correction dictionary 302 is deleted. Accordingly, a risk of deleting the correction rule at a stage where the target child has not mastered the correct speech of the word can be avoided.

Moreover, among the correction rule which is associated with the misrecognized word and the corrected word registered in the misrecognition correction dictionary 302, instead of deleting the correction rule of the word which is determined that the target child has mastered, the dictionary updater 209 may invalidate an entry which corresponds to the correction rule using a flag and the like. When a new correction rule is registered additionally, the invalidated entry may be overwritten.

In addition, in the first embodiment, the correction history table 304 stores the timestamp indicating the date when the correction rule is applied as criteria to determine whether the target child has mastered the correct pronunciation of the word. However, the present disclosure is not limited to this in particular. FIG. 11 illustrates another example of the correction history table according to the first embodiment. As shown in FIG. 11, the correction history table may store the correction frequency indicating the frequency when the correction rule is used, for example, the number of times corrected in one month may be stored as the correction frequency. At the timing when the correction frequency is at or below the predetermined threshold value, the correction rule is stored as deletion candidate. When the correction rule, which is stored as the deletion candidate, is further not applied for the predetermined period, the dictionary updater 209 may delete the deletion rule. In this way, by making the determination of deletion in steps, the correction rule to which the target child no longer speaks the misrecognized word can be deleted.

Moreover, instead of the correction history table including the corresponding relation with the frequency of which the target child (target speaker) speaks the misrecognized word intending to speak the corrected word, the misrecognition correction dictionary 302 may include the corresponding relation between the misrecognized word and the frequency in which the target child (target speaker) speaks the misrecognized word matching the spoken word. When the spoken word is registered as the corrected word in the misrecognition correction dictionary (second dictionary) 302, the highest match degree is at least the first threshold value, and the frequency corresponding to the misrecognized word matching the spoken word is at or less than the second threshold value, a combination between the misrecognized word matching the spoken word and the corrected word corresponding to the misrecognized word may be deleted from the misrecognition correction dictionary (second dictionary) 302 by the dictionary updater 209.

Furthermore, in the first embodiment, the recognition history table 303 stores the word and mastery level in association as the criteria to determine whether or not the target child has mastered the correct pronunciation of the word. However, the present disclosure is not limited to this in particular. FIG. 12 illustrates another example of the recognition history table according to the first embodiment. As shown in FIG. 12, the recognition history table may further store the speech frequency of the speech having the mastery level exceeding the threshold value. For example, the number of times when the mastery level exceeding the threshold value in one month may be stored as the speech frequency. When the word having the mastery level exceeding the predetermined threshold value is spoken more than the predetermined number of times, the dictionary updater 209 may determine using the correction history table 304 whether or not the correction rule including the word is to be deleted. Accordingly, the unnecessary correction rule including the word, which the target child can speak more accurately, can be deleted.

In addition, instead of updating the unrecognition correction dictionary 302 at the timing when the voice recognition result is obtained, the dictionary updater 209 may regularly check the mastery level of the word registered in the recognition history table 303 and determine whether or not the correction rule for all words with masterly level exceeding the threshold value can be deleted. In other words, when a process is repeated the predetermined number of times, the process of recording the first word corresponding to the highest match degree associated with the match degree in the recognition history table 303 (history table), based on the match degree of the recognition history table 303 (history table), the misrecognition correction dictionary (second dictionary) may be corrected by correcting the corresponding relation between the misrecognized word (second word) registered in the misrecognition correction dictionary (second dictionary) 302 and the corrected word (third word) by the dictionary updater 209. Accordingly, the processing load during the voice recognition can be reduced.

Further, although the target speaker in the first embodiment is the target child, the present disclosure is not limited to this in particular. The target speaker may be a specific person who is unable to speak the word correctly. For example, the target speaker may be the specific person who is learning a foreign language.

Furthermore, in the first embodiment, the dictionary, which is used for correcting the misrecognition in English voice recognition, is revised, however, the present disclosure is not limited to this in particular. For example, the dictionary, which is used to correct the misrecognition in the voice recognition in a language other than English such as Japanese, Chinese, and the like, may be corrected.

Second Embodiment

The configuration of the voice interaction processing apparatus 200 according to a second embodiment is obtained by omitting the history information updater 207, the recognition history table 303, and the correction history table 304 from the voice interaction processing apparatus 200 according to the first embodiment shown in FIG. 1, and therefore, the description is omitted.

Figure 13:
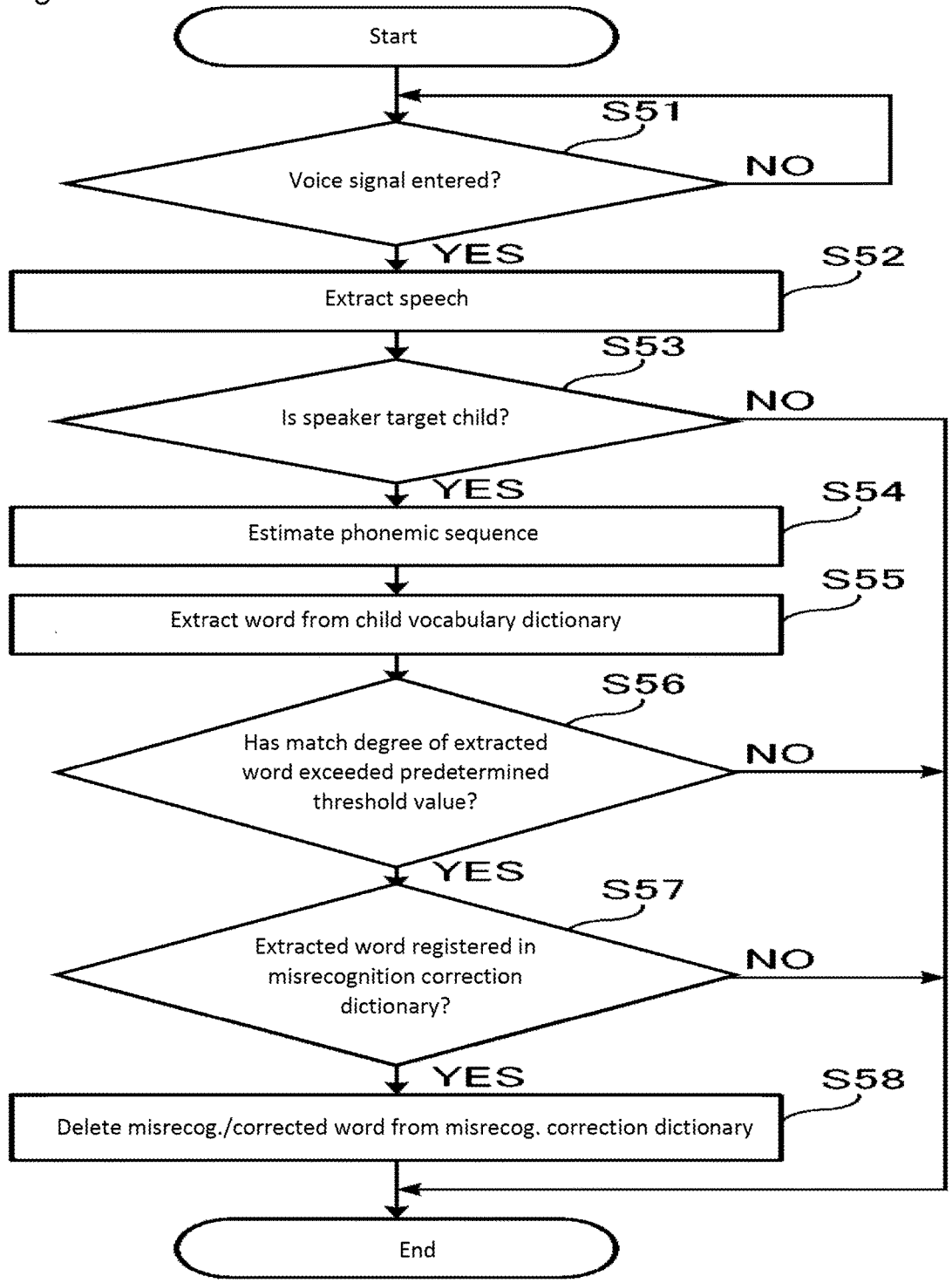
FIG. 13 is a flow chart illustrating a method of correcting a dictionary which revises the misrecognition correction dictionary used for correcting the misrecognition in the voice recognition according to a second embodiment.

FIG. 13 is a flow chart illustrating a method of correcting a dictionary which revises a misrecognition correction dictionary used for correcting misrecognition in voice recognition according to the second embodiment.

The processes included in steps S51 to S55 are the same processes with steps S1 to S5 indicated in FIG. 6.

Next, the dictionary updater 209 determines whether or not the match degree of the extracted word has exceeded the predetermined threshold value (step S56). When it is determined that the match degree of the extracted word is not exceeding the threshold value (NO in step S56), the process ends.

On the other hand, when it is determined that the match degree of the extracted word is exceeding the predetermined threshold value (YES in step S56), the dictionary updater 209 determines whether or not the extracted word is registered as the corrected word in the misrecognition correction dictionary 302 (step S57). When it is determined that the extracted word is not registered as the corrected word in the misrecognition correction dictionary 302 (NO in step S57), the process ends.

On the other hand, when it is determined that the extracted word is registered as the corrected word in the misrecognition correction dictionary 302 (YES in step S57), the dictionary updater 209 determines that the corrected word which is the extracted word and the misrecognized word which corresponds to the corrected word are no longer used, then the misrecognized word and the corrected word are deleted from the misrecognition correction dictionary 302 (step S58).

Third Embodiment

Figure 14:
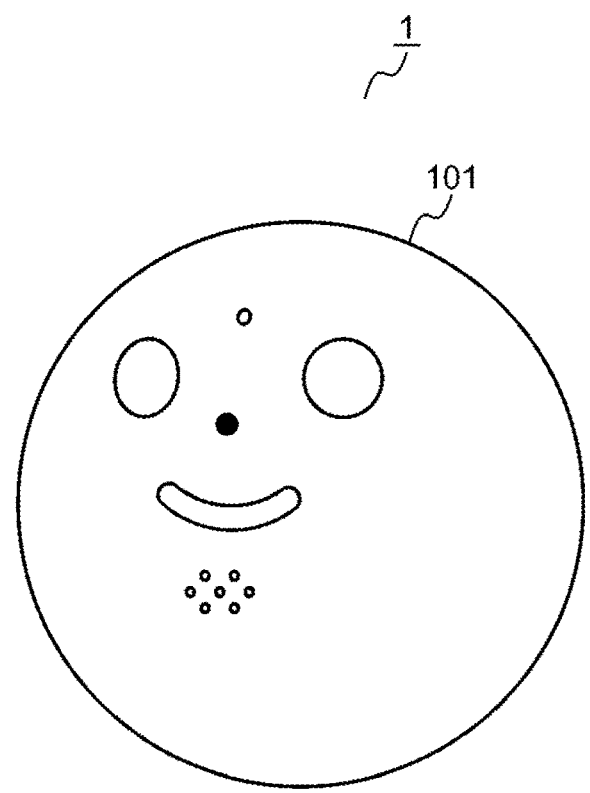
FIG. 14 is an external perspective view of a robot according to a third embodiment of the present disclosure.

FIG. 14 is an external perspective view of a robot according to a third embodiment in the present disclosure. As shown in FIG. 14, a robot 1 includes a sphere shaped casing 101. The casing 101 is configured by a transparent member or a translucent member, for example.

Figure 15:
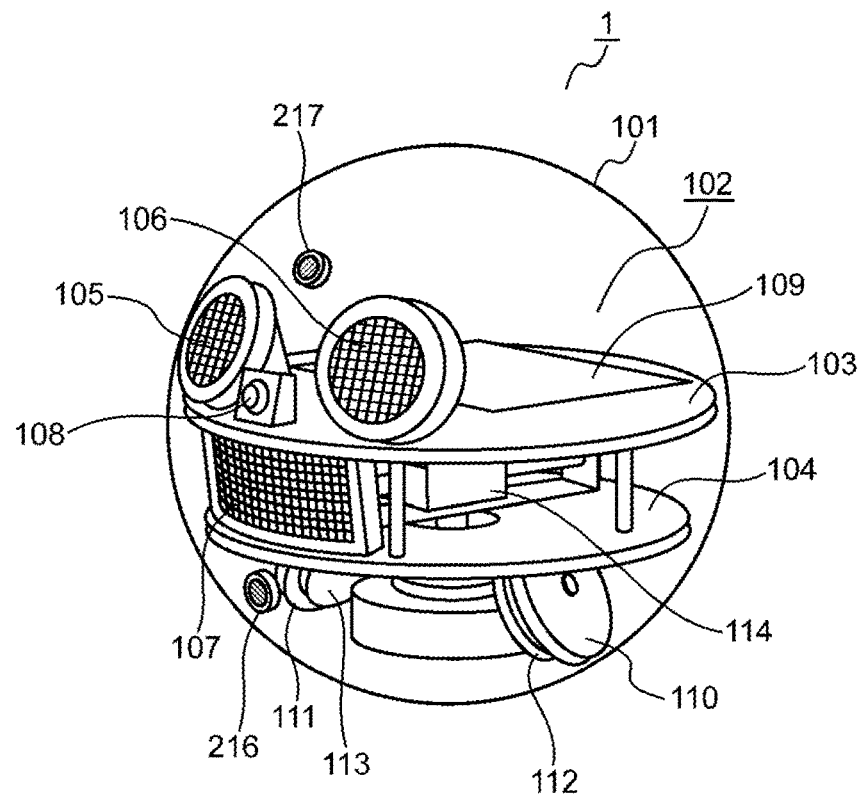
FIG. 15 is an internal perspective view of the robot according to the third embodiment of the present disclosure.

FIG. 15 is an internal perspective view of the robot according to the third embodiment in the present disclosure.

In FIG. 15, a frame 102 is arranged inside the casing 101. The frame 102 includes a first rotation plate 103 and a second rotation plate 104. The first rotation plate 103 is arranged in an upper right area with respect to the second rotation plate 104.

As shown in FIG. 15, a first display 105 and a second display 106 are provided on a top surface of the first rotation plate 103. In addition, a third display 107 is provided on the top surface of the second rotation plate 104. The first display 105, the second display 106, and the third display 107 are configured by a plurality of light emitting diodes, for example. The first display 105, the second display 106, and the third display 107 display information of facial expression of the robot. Specifically, the first display 105, the second display 106, and the third display 107 display, as shown in FIG. 14, a portion of the face of the robot 1 such as an eye or a mouth, for example, by individually controlling lighting of the plurality of light emitting diodes. In the example shown in FIG. 14, the first display 105 displays an image of a right eye, the second display 106 displays the image of a left eye, and the third display 107 displays the image of the mouth. The images of the left eye, the right eye, and the mouth pass though the casing 101, which is configured by the transparent or the translucent member, and are emitted outside.

As shown in FIG. 15, a camera 108 is provided on the top surface of the first rotation plate 103. The camera 108 obtains images of surrounding environment of the robot 1. As shown in FIG. 14, the camera 108 configures the portion of the face of the robot 1, such as a nose, for example. Therefore, an optical axis of the camera 108 is directed toward a front of the robot 1. Accordingly, the camera 108 can take a picture of a recognition target object which is present in front.

A microphone 217 acquires voice data of surrounding environment of the robot 1. The microphone 217 is attached to the frame 102, converts the sound into an electric signal, and outputs to a main controller 230. The microphone 217 may be attached to the top surface of the first rotation plate 103 or the second rotation plate 104, for example. As shown in FIG. 14, the microphone 217 is arranged at a forehead area of the robot 1 and a small hole is formed in the casing 101 at the position corresponding to the forehead of the robot 1.

A speaker 216 is attached to the frame 102 such that an output screen faces a front surface and converts the electric signal of the voice into physical vibration. As shown in FIG. 14, the speaker 216 is arranged at a chin area of the robot 1 and a plurality of small holes are formed in the casing 101 at the position corresponding to the chin of the robot 1. The main controller 230 causes the robot 1 to speak by outputting the predetermined voice from the speaker 216.

As shown in FIG. 15, a control circuit 109 is attached to the top surface of the first rotation plate 103. The control circuit 109 controls various operations of the robot 1. Details of the control circuit 109 are described later with reference to FIG. 16.

A first drive wheel 110 and a second drive wheel 111 are attached respectively to a bottom surface of the second rotation plate 104 and contact an inner peripheral face of the casing 101. In addition, the first drive wheel 110 includes a first motor 112 for driving the first drive wheel 110. Similarly, the second drive wheel 111 includes a second motor 113 for driving the second drive wheel 111. In other words, the first drive wheel 110 and the second drive wheel 111 are driven by an independent individual motor separated from one another. The first drive wheel 110 and the second drive wheel 111 configure a set of the drive wheels.

When rotating the first drive wheel 110 and the second drive wheel 111 in a forward direction, the casing 101 rotates forward with motive power. Accordingly, the robot 1 moves forward. Conversely, when rotating the first drive wheel 110 and the second drive wheel 111 in a reverse direction, the robot 1 moves backwards.

In addition, when the first drive wheel 110 and the second drive wheel 111 are rotated in directions opposite to each other, the casing 101 performs, with the motive power, a rotation operation around a vertical axis which passes though the center. In other words, the robot 1 rotates counterclockwise or clockwise on the spot. The robot 1 moves by such advancing, reversing, or rotation operations.

A counterweight 114 is provided between the first rotation plate 103 and the second rotation plate 104. The counterweight 114 is located slightly below a center of the casing 101. Therefore, a center of gravity of the robot 1 is located below the center of the casing 101. Accordingly, the operation of the robot 1 can be stabilized.

The robot 1 further includes a power supply which is not shown in the drawing. The robot 1 is charged by a charger (not shown).

Figure 16:
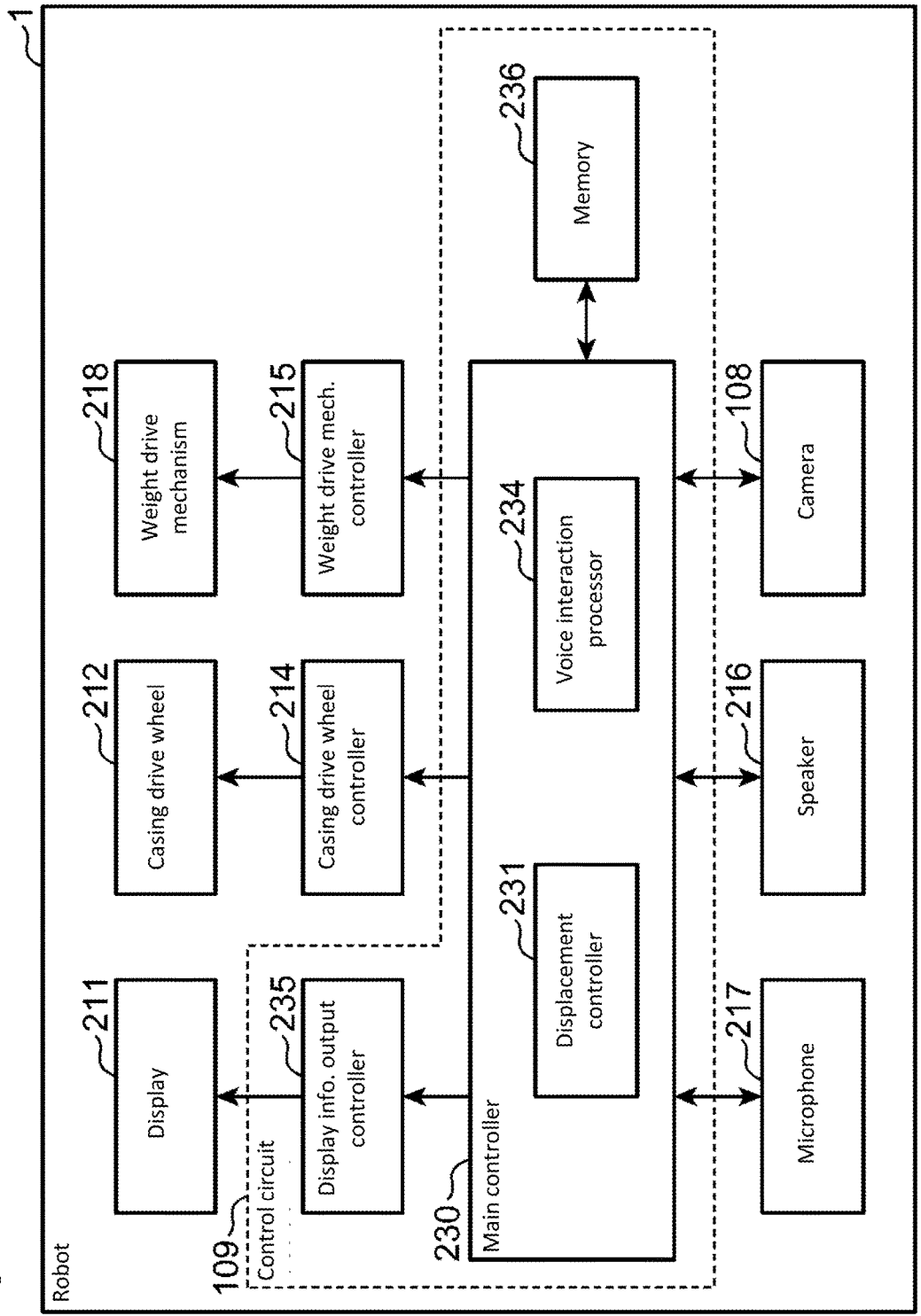
FIG. 16 is a block diagram illustrating a configuration of the robot according to the third embodiment of the present disclosure.

Next, an internal circuit of the robot 1 according to the third embodiment of the present disclosure is described in detail with reference to FIG. 16. FIG. 16 is a block diagram illustrating a configuration of the robot according to the third embodiment of the present disclosure.

As shown in FIG. 16, the robot 1 includes the control circuit 109, a display 211, a casing drive wheel controller 214, a casing drive wheel 212, a weight drive mechanism controller 215, a weight drive mechanism 218, the microphone 217, the speaker 216, and the camera 108.

The control circuit 109 is configured by a memory 236, the main controller 230 which is configured by a processor such as a CPU, and a display information output controller 235.

The memory 236 is configured by a rewritable nonvolatile storage device, for example, and stores a control program and the like of the robot 1.

The main controller 230 performs the control program of the robot 1 which is stored in the memory 236. Accordingly, the main controller 230 functions as a displacement controller 231 and a voice interaction processor 234.

The voice interaction processor 234 includes the speech extractor 201, the target child determiner 202, the voice recognizer 203, the intention reader 204, the response generator 205, the voice synthesizer 206, the history information updater 207, correction rule registrar 208, and the dictionary updater 209 as shown in FIG. 1. In addition, the memory 236 includes the child vocabulary dictionary 301, the misrecognition correction dictionary 302, the recognition history table 303, and the correction history table 304 as shown in FIG. 1. Further, the microphone 217 includes the function of the voice inputter 100 in FIG. 1 and the speaker 216 includes the function of the voice outputter 300 in FIG. 1.

The voice interaction processor 234 recognizes the voice of the speaker from the microphone 217, understands the intention of the speech content based on the recognition result, generates a response speech which corresponds to the intention of the speech content, and outputs the generated response speech from the speaker 216.

The operation of the voice interaction processor 234 of the third embodiment is the same as the voice interaction processing apparatus 200 of the first embodiment, and therefore the description is omitted.

As described with FIG. 15, the camera 108 captures the front image of the robot 1 and outputs the image captured (hereafter referred to as the captured image) to the main controller 230. The main controller 230 controls a face recognition result by recognizing a presence, a location, and a size of the face of the user from the captured image obtained by the camera 108 and by storing the face recognition result in the memory 236.

The displacement controller 231 controls a displacement of the robot 1. The displacement controller 231 generates a command based on the voice recognition result and the face recognition result, and outputs the command to the display information output controller 235, the casing drive wheel controller 214, the weight drive mechanism controller 215, and the like.

The display information output controller 235 displays on the display 211 a display information of an expression of the robot 1 corresponding to the command which is transmitted from the displacement controller 231. The display 211 is configured by the first display 105, the second display 106, and the third display 107 which are described with FIG. 15.

The casing drive wheel controller 214 operates the casing drive wheel 212 of the robot 1 in accordance with the command which is transmitted from the displacement controller 231. The casing drive wheel controller 214 is configured by the first motor 112 and the second motor 113 as described with FIG. 15. The casing drive wheel 212 is configured by the first drive wheel 110 and the second drive wheel 111 as described with FIG. 15. The casing drive wheel 212 and the casing drive wheel controller 214 correspond to an example of the displacement mechanism.

The weight drive mechanism controller 215 operates the weight drive mechanism 218 of the robot 1 in accordance with the command transmitted from the displacement controller 231. The weight drive mechanism controller 215 is configured by a weight drive motor (not shown in drawing) which is built in the counterweight 114. By displacing the location of the counterweight 114, the weight drive mechanism 218 controls a posture of the robot 1.

In the present disclosure, the unit, the device, the member, all or a part of these, or all or part of the function block of the block diagram shown in the drawings may be executed by one or a plurality of electronic circuits to include a semiconductor device, a semiconductor integrated circuit (IC), or an LSI (Large Scale Integration). The LSI or the IC may be integrated in one chip or may be configured by combining a plurality of chips. For example, the function block other than a memory element may be integrated in one chip. In this example, although referred to as the LSI or IC, depending on the degree of integration, may be referred to as a system LSI, VLSI (Very Large Scale Integration), or a ULSI (Ultra Large Scale Integration). A Field Programmable Gate Array (FPGA) which is programmed after LSI manufacturing, a reconfiguration of connection relation inside the SLI, or a Reconfigurable Logic Device which can set up a circuit section inside the LSI can also be used for the same purpose.

Further, the unit, the device, the member, or the function or the operation of all or part of these can be executed by software processing. In this case, the software is recorded in a non-transitory recording media such as one or a plurality of ROMs, optical disks, and hard disk drives. When the software is executed by a processing device (Processor), the function specified by the software is executed by the processing device (Processor) and a peripheral device. The system or the device may include one or more non-transitory recording media on which the software is recorded, the processing device (Processor), and a required hardware device such as an interface, for example.

INDUSTRIAL APPLICABILITY

The method of correcting the dictionary, the program for correcting the dictionary, the voice processing apparatus, and the robot according to the present disclosure can correct the dictionary which is used for the voice processing apparatus in accordance with the language mastery level of the speaker, can improve the accuracy of the voice recognition, and are useful as the method of correcting the dictionary, the program for correcting the dictionary, the voice processing apparatus, and the robot which correct the dictionary used for the voice processing apparatus.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A method of correcting a dictionary used in a voice processing apparatus, the method comprising:
   first extracting a speech of a target speaker from audio collected by a microphone corresponding to the voice processing apparatus;
   estimating a speech phonemic sequence configuring the speech;
   calculating a match degree, using a first dictionary, between the speech phonemic sequence and a first phonemic sequence that corresponds to a first word registered in the first dictionary, the first dictionary being stored in a memory included in the voice processing apparatus and indicating a corresponding relation between the first word and the first phonemic sequence;
   second extracting, from the first dictionary, the first word corresponding to a highest match degree as a spoken word spoken by the target speaker;
   first correcting a second dictionary based on the highest match degree, the second dictionary indicating a corresponding relation between a second word and a third word, the third word corresponding to a language unit spoken by the target speaker intending to speak the second word; and
   second correcting the second dictionary by correcting the corresponding relation between the third word matching the spoken word and the second word that corresponds to the third word.

2. The method according to claim 1,
   wherein when the spoken word is included in the second dictionary and the highest match degree is at least a first threshold value, the second dictionary is corrected by deleting, from the second dictionary, a combination of the second word matching the spoken word and the third word that corresponds to the second word.

3. The method according to claim 1,
   wherein the second dictionary further includes the corresponding relation between the second word and frequency of the target speaker speaking the third word which matches the spoken word, and
   wherein when the spoken word is registered in the second dictionary as the second word, the highest match degree is at least the first threshold value, and the frequency of the third word that corresponds to the second word which matches the spoken word is at or less than a second threshold value, the second dictionary is corrected by deleting, from the second dictionary, the combination of the second word matching the spoken word and the third word that corresponds to the second word.

4. The method according to claim 1,
   wherein the target speaker is a target child who is an object of voice recognition in the voice processing apparatus,
   wherein whether or not the speaker is the target child is determined by comparing a voiceprint extracted from the speech and the voiceprint of the target child previously recorded in the memory, and
   wherein the speech phonemic sequence is estimated when the speaker is determined to be the target child.

5. The method according to claim 1,
   wherein the memory further stores a history table indicating the corresponding relation between the first word and the match degree, and
   wherein when a process of recording the first word corresponding to the highest match degree in association with the match degree in the history table is repeated a predetermined number of times, the second dictionary is corrected, based on the match degree in the history table, by correcting the corresponding relation between the second word and the third word registered in the second dictionary.

6. A non-transitory computer readable storage medium encoded with an executable computer program for correcting a dictionary used in a voice processing apparatus, that when executed by a processor causes the processor to perform operations, the operations comprising:
   first extracting a speech of a target speaker from audio collected from a microphone corresponding to the voice processing apparatus;
   estimating a speech phonemic sequence configuring the speech;
   calculating a match degree, using a first dictionary, between the speech phonemic sequence and a first phonemic sequence that corresponds to a first word registered in the first dictionary, the first dictionary being stored in a memory included in the voice processing apparatus and indicating a corresponding relation between the first word and the first phonemic sequence;
   second extracting, from the first dictionary, the first word corresponding to a highest match degree as a spoken word spoken by the target speaker;
   first correcting a second dictionary based on the highest match degree, the second dictionary indicating a corresponding relation between a second word and a third word, the third word corresponding to a language unit spoken by the target speaker intending to speak the second word; and second correcting the second dictionary by correcting the corresponding relation between the third word matching the spoken word and second word that corresponds to the third word.

7. A voice processing apparatus, comprising:
a processor; and
a memory,
wherein the processor executes a computer program to perform operations, the operations including
- first extracting a speech of a target speaker from audio collected from a microphone corresponding to the voice processing apparatus;
- estimating a speech phonemic sequence configuring the speech;
- calculating a match degree, using a first dictionary, between the speech phonemic sequence and a first phonemic sequence that corresponds to a first word registered in the first dictionary, the first dictionary being stored in a memory and indicating a corresponding relation between the first word and the first phonemic sequence;
- second extracting, from the first dictionary, the first word corresponding to a highest match degree as a spoken word spoken by the target speaker;
- first correcting a second dictionary based on the highest match degree, the second dictionary indicating the corresponding relation between a second word and a third word, the third word corresponding to a language unit spoken by the target speaker intending to speak the second word; and
- second correcting the second dictionary by correcting the corresponding relation between the third word matching the spoken word and the second word that corresponds to the third word.

8. A robot, comprising:
a voice processing apparatus according to claim 7;
a casing in which the voice processing apparatus is incorporated; and
a displacement mechanism displacing the casing.

* * * * *